March 26, 1929. R. C. BENNER 1,706,951
ELECTROLYTIC APPARATUS
Filed June 28, 1924
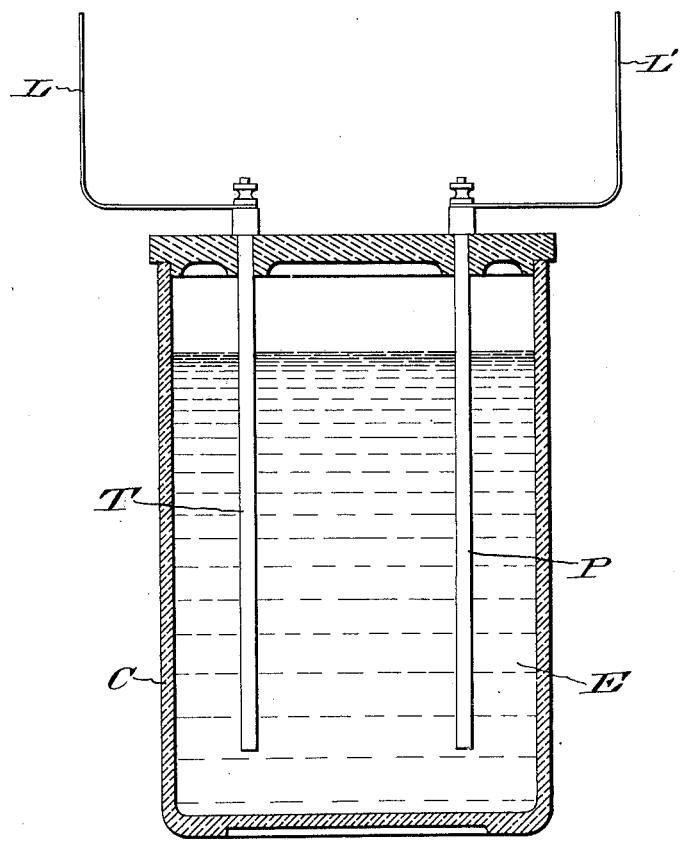
Inventor:
Raymond C. Benner
By Byrnes Townsend Brickenstein
Attorneys.

Patented Mar. 26, 1929.

1,706,951

UNITED STATES PATENT OFFICE.

RAYMOND C. BENNER, OF BAYSIDE, NEW YORK, ASSIGNOR TO NATIONAL CARBON COMPANY, INC., A CORPORATION OF NEW YORK.

ELECTROLYTIC APPARATUS.

Application filed June 28, 1924. Serial No. 723,049.

This invention relates to electrolytic apparatus, and particularly to an improved electrolytic rectifier, the valve action of which depends upon a dielectric film that is formed upon the surface of a so-called filming electrode when the latter and a cooperating electrode are placed in a suitable electrolyte and subjected to an electric current.

Electrodes of filming material, such as aluminum and tantalum, have heretofore been associated with lead electrodes in sulfuric acid and other electrolytes in electrolytic appartus, such as rectifiers. However, in the operation of lead-sulfuric-acid-tantalum rectifiers for example, objectionable conditions are encountered, such as the rapid deterioration and disintegration of the lead electrode.

The present invention aims to avoid the aforesaid objections and, briefly, consists in employing an electrode comprising a dense coherent non-deteriorating conductive solid and non-porous metal oxide, such as dense lead peroxide, manganese peroxide, magnetite, or mixtures of two or more thereof, in place of the usual lead electrode in lead-sulfuric-acid-tantalum and other electrolytic rectifiers.

The accompanying drawing diagrammatically illustrates an electrolytic apparatus, such as a rectifier, embodying this invention, in which a suitable vessel C is employed to contain an electrolyte E and the cooperating electrodes T and P which are immersed in the electrolyte an electrically connected in series circuit with a suitable source of alternating current and a direct current consuming means, by conductors L, L'. The electrode T is substantially insoluble in the electrolyte and in the rectifier shown desirably comprises filming material that operates to permit free flow of electric current when it is the cathode but operates to substantially obstruct the current flow when it is the anode.

The filming electrode T desirably comprises tantalum, which may consist of a bar, plate or strip of tantalum. The electrolyte E in the present rectifier consists of sulfuric acid, desirably dilute sulfuric acid of about 1.25 specific gravity, but may be of different gravity and consist of or contain other substances.

The cooperating electrode or anode P has heretofore been formed of a bar or plate of lead. In such rectifiers, the tantalum electrode is not consumed if properly used, whereas the decomposing action of the sulfuric acid electrolyte deteriorates and disintegrates the usual lead electrode quite rapidly, especially when the rectifier is operating at relatively high current densities and also in a less degree when the rectifier is idle.

Acording to the present invention, the electrode P comprises dense non-porous coherent material, such as a conductive solid metal oxide, that is substantially inert to and will not deteriorate or disintegrate in the particular electrolyte used. Graphite, magnetite, lead peroxide, manganese peroxide and mixtures of these are examples of such inert materials.

Lead peroxide in massive form is an especially advantageous material for this purpose because it is a good electrical conductor, substantially non-porous, non-deteriorating and insoluble in sulfuric acid and other electrolytes, even at high current densities. It has been found that lead peroxide electrodes, for example, operate satisfactorily at current densities of from 125 to 150 amperes per square foot whereas lead electrodes generally do not operate efficiently above about 20 amperes per square foot, under substantially the same conditions. Moreover, the lead peroxide is electronegative with respect to the tantalum or other filming electrode used in the sulfuric acid electrolyte and cooperates with such filming electrode substantially without deleterious effect upon the filming characteristic thereof. Hence, for a chemical rectifier of a given capacity, a much smaller area of lead-peroxide electrode surface is required and consequently a rectifier embodiyng a conductive metal oxide electrode such as lead peroxide may be made lighter and more compact than one having a lead electrode. It is therefore more feasible to combine this improved rectifier with portable batteries and similar apparatus as charging equipment therefor.

The improved metal oxide electrode P may be made in a number of ways, but desirably consists of a dense coherent conductive body of metal oxide, such as may be molded, coated or electrolytically deposited upon a suitable conductive support. In one form, lead peroxide may be electrodeposited on a corrosion-resistant conductive support such as nickel, Monel metal, iron or nichrome wire or gauze; in another form, lead peroxide may be electroplated onto a suitable carbon or graphite body; in a third form, lead peroxide may be electrolytically deposited on a suitable support from which it can be readily removed and cut into suitable size solid pieces for rectifier electrodes. The electrodeposited lead peroxide coating may contain pinholes which are desirably filled with a suitable inert plastic which will render the electrode non-porous and prevent penetration of the acid electrolyte through such pinholes to the conductive support, which would otherwise deteriorate the latter.

A satisfactory inert non-porous molded electrode may be provided by mixing suitable proportions of powdered lead peroxide and manganese nitrate solution to a plastic mass, from which suitable electrodes may be molded. The molded bodies may be heated to a temperature, say about 220° C., that will drive off the nitrogen oxides and leave solid nondeteriorating conductive electrodes containing about 95% lead peroxide and about 5% manganese peroxide, the latter acting principally as a binder for the lead peroxide. Other plastic substances, such as paraffin, may also be used as a binder for the lead peroxide.

Metal oxide electrodes, such as those of lead peroxide, manganese peroxide, and mixtures thereof, have a very high contact resistance with many substances, which makes it quite difficult to provide a low resistance circuit connection therewith in the usual manner. A low resistance contact connection is necessary, especially when the electrode and rectifier operate at a high current density. Satisfactory terminals having low resistance contact with lead peroxide, manganese peroxide and similar electrodes may be provided in various ways. A mass of graphite may be molded and pressed against one end of the lead peroxide or similar electrode to form a terminal thereon to which a circuit conductor may be connected. Also, the terminal end of such electrodes may be coated with lead or other suitable conductive and non-corrodible metal either by dipping such end in a molten metal or by spraying the terminal metal thereon. The terminal metal may also be formed on the metal oxide electrode by depositing lead or similar non-corrodible conductive metal electrolytically on the terminal end of the electrode at very high current densities from a solution of lead fluosilicate in water-acid with hydrofluosilicic acid. Still another method of making a terminal consists in casting onto one end of the electrode a low melting point alloy such as Roses metal, which has a melting point preferably below 200° C. or considerably less than the decomposition temperature of lead peroxide, which is about 290° C. It appears that metals and alloys having melting points higher than approximately 200° C. do not adhere readily to the lead peroxide or the manganese dioxide or mixtures of these.

The circuit conductor may be soldered or otherwise secured to the electrode terminals described above, and a protective coating of pitch or the like may be applied to such terminals, thereby providing a connection which resists deterioration at high current densities. Certain features of this invention, such as the improved electrodes, are adapted for service in electrolytic apparatus generally, as in cells for the electrolytic production of sodium-hydroxide and chlorine. Other changes and additions may be made without departing from the spirit of the invention disclosed.

I claim:

1. In electrolytic apparatus, an electrolyte, and cooperating electrodes therein, one of said electrodes comprising film-forming material, the other electrode comprising a solid metal oxide that is substantially non-disintegrating in said electrolyte.

2. Electrolytic apparatus comprising a tantalum electrode, an electrode comprising lead peroxide, and an electrolyte containing said electrodes.

3. An electrolytic rectifier comprising an electrode of film-forming material, an electrode comprising a conductive solid metal oxide, and an electrolyte containing said electrodes.

4. In an electrolytic rectifier, the combination of an electrode comprising film-forming material, an electrode comprising lead peroxide, and sulfuric-acid electrolyte in which said electrodes are immersed.

5. In an electrolytic rectifier, the combination of an electrode comprising tantalum, an electrode comprising lead peroxide, and a dilute sulfuric-acid electrolyte in which said electrodes are immersed.

6. An electrode consisting of a body of graphite having a coating of lead peroxide in direct contact therewith.

7. In an electrolytic rectifier, the combination of an electrode comprising film forming material, an electrode comprising a mixture of lead peroxide and manganese peroxide and an electrolyte containing said electrodes.

8. In an electrolytic rectifier, the combination of an electrode comprising film forming material, an electrode comprising a substantially non-porous body principally containing an insoluble metal oxide and a binder and an electrolyte in which said electrodes are immersed.

In testimony whereof, I affix my signature.

RAYMOND C. BENNER.